US009348476B2

(12) United States Patent
Lee (10) Patent No.: US 9,348,476 B2
(45) Date of Patent: May 24, 2016

(54) DISPLAY DEVICE WITH INTEGRATED TOUCH SCREEN AND DRIVING METHOD THEREOF

(71) Applicant: LG Display Co., Ltd., Seoul (KR)

(72) Inventor: Young Joon Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/508,062

(22) Filed: Oct. 7, 2014

(65) Prior Publication Data
US 2015/0179133 A1    Jun. 25, 2015

(30) Foreign Application Priority Data

Dec. 19, 2013   (KR) .......................... 10-2013-0158963

(51) Int. Cl.
*G09G 5/00*      (2006.01)
*G06F 3/044*     (2006.01)
*G06F 3/041*     (2006.01)
*G09G 3/20*      (2006.01)
*G09G 3/36*      (2006.01)

(52) U.S. Cl.
CPC .............. *G06F 3/044* (2013.01); *G06F 3/0412* (2013.01); *G06F 3/0416* (2013.01); *G09G 3/20* (2013.01); *G09G 3/3655* (2013.01); *G09G 2300/08* (2013.01); *G09G 2310/066* (2013.01); *G09G 2330/025* (2013.01); *G09G 2330/06* (2013.01)

(58) Field of Classification Search
None
See application file for complete search history.

(56) References Cited

U.S. PATENT DOCUMENTS

| 7,859,521 B2 | 12/2010 | Hotelling et al. | |
| 2012/0056835 A1* | 3/2012 | Choo | G06F 3/0412 345/173 |
| 2014/0176495 A1* | 6/2014 | Vlasov | G06F 3/044 345/174 |

* cited by examiner

*Primary Examiner* — Joseph Haley
*Assistant Examiner* — Emily Frank
(74) *Attorney, Agent, or Firm* — Morgan, Lewis & Bockius LLP (57) ABSTRACT

A display device with integrated touch screen is provided. The display device includes a panel configured to include a plurality of driving electrodes and a plurality of sensing electrodes and a display driver IC configured to apply a common voltage to the plurality of driving electrodes and the plurality of sensing electrodes when the panel operates in a display driving mode, and when the panel operates in a touch driving mode, generate a pulse-modulated driving pulse according to a timing pulse and a pulse modulation control signal to apply the pulse-modulated driving pulse to the plurality of driving electrodes, and respectively receive a plurality of sensing signals from the plurality of sensing electrodes.

13 Claims, 5 Drawing Sheets

DISPLAY DEVICE WITH INTEGRATED TOUCH SCREEN AND DRIVING METHOD THEREOF

CROSS-REFERENCE TO RELATED APPLICATIONS

This application claims the benefit of the Korean Patent Application No. 10-2013-0158963 filed on Dec. 19, 2013, which is hereby incorporated by reference as if fully set forth herein.

BACKGROUND OF THE INVENTION

1. Field of the Invention

The present invention relates to a display device, and more particularly, to a display device with integrated in-cell type touch screen and a driving method thereof.

2. Discussion of the Related Art

Touch screens are a type of input device that is included in display devices such as liquid crystal display (LCD) devices, field emission displays (FEDs), plasma display panels (PDPs), electroluminescent displays (ELDs), and electrophoretic displays (EPDs), and enables a user to input information by directly touching a screen with a finger, a pen or the like while looking at the screen of the display device.

Particularly, the demand for display devices with integrated in-cell type touch screen, which include a plurality of built-in elements configuring the touch screen for slimming portable terminals such as smart phones and tablet personal computers (PCs), is recently increasing.

In a related art display device with integrated in-cell type touch screen disclosed in U.S. Pat. No. 7,859,521, a plurality of common electrodes for display are segmented into a plurality of touch driving areas and touch sensing areas, thereby allowing a mutual capacitance to be generated between the touch driving area and the touch sensing area. Therefore, the related art display device measures a mutual capacitance change that occurs in touch, and thus determines whether there is a touch.

In the display device with integrated in-cell type touch screen, a driving pulse is applied to common electrodes corresponding to a touch driving area when a panel operates in a touch diving mode in order for each of the common electrodes to perform a function of a touch electrode.

A driving pulse applied to common electrodes corresponding to a touch driving area generally has a square type. An RC load is caused by a length between a common electrode formed in the touch driving area and a circuit unit applying the driving pulse, and for this reason, RC delay occurs in a waveform applied to the touch driving area, causing a distortion of the waveform. As a result, as the distance becomes farther away from the circuit unit, an RC delay deviation increases, and thus, a time taken in charging the touch driving area is changed. For this reason, a deviation of and a reduction in touch performance occur in each touch driving area.

SUMMARY OF THE INVENTION

Accordingly, the present invention is directed to provide a display device with integrated in-cell type touch screen and a driving method thereof that substantially obviate one or more problems due to limitations and disadvantages of the related art.

An object of the present invention is to provide a display device with integrated in-cell type touch screen, which pulse-modulates a diving pulse for touch driving, thereby enhancing touch performance.

Additional features and advantage of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a display device with integrated touch screen comprises a panel configured to include a plurality of driving electrodes and a plurality of sensing electrodes; and a display driver IC configured to apply a common voltage to the plurality of driving electrodes and the plurality of sensing electrodes when the panel operates in a display driving mode, and when the panel operates in a touch driving mode, generate a pulse-modulated driving pulse according to a timing pulse and a pulse modulation control signal to apply the pulse-modulated driving pulse to the plurality of driving electrodes, and respectively receive a plurality of sensing signals from the plurality of sensing electrodes.

In another aspect, a method of driving a display device with integrated touch screen, which includes a panel including a plurality of driving electrodes and a plurality of sensing electrodes, a display driver IC, and a touch IC, comprises applying, by the display driver IC, a common voltage to the plurality of driving electrodes and the plurality of sensing electrodes when the panel is operating in a display driving mode; generating, by the touch IC, a timing pulse to output the timing pulse to the display driver IC when the panel is operating in a touch driving mode; and generating, by the display driver IC, a pulse-modulated driving pulse according to a timing pulse and a pulse modulation control signal to apply the pulse-modulated driving pulse to the plurality of driving electrodes, and respectively receiving a plurality of sensing signals from the plurality of sensing electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In this disclosure below, for convenience of a description, a display device with integrated touch screen according to embodiments of the present invention will be exemplarily described as being an LCD device, but the present invention is not limited thereto. The present invention may be applied to various display devices such as FEDs, PDPs, ELDs, and EPDs. Also, a description on the general configuration of an LCD device is not provided.

Figure 1:
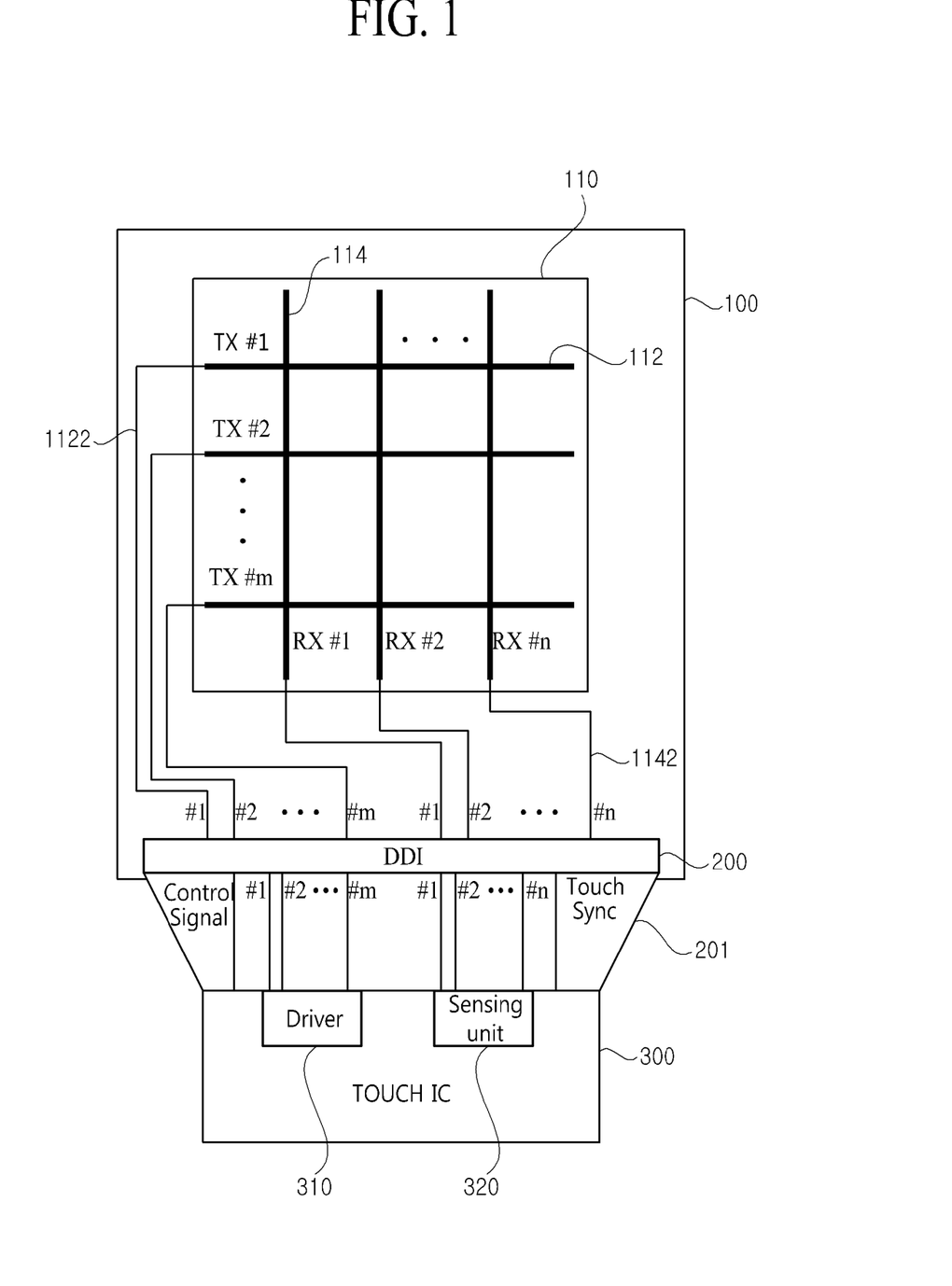
FIG. 1 is a diagram schematically illustrating a configuration of a display device with integrated touch screen according to embodiments of the present invention.
Figure 2:
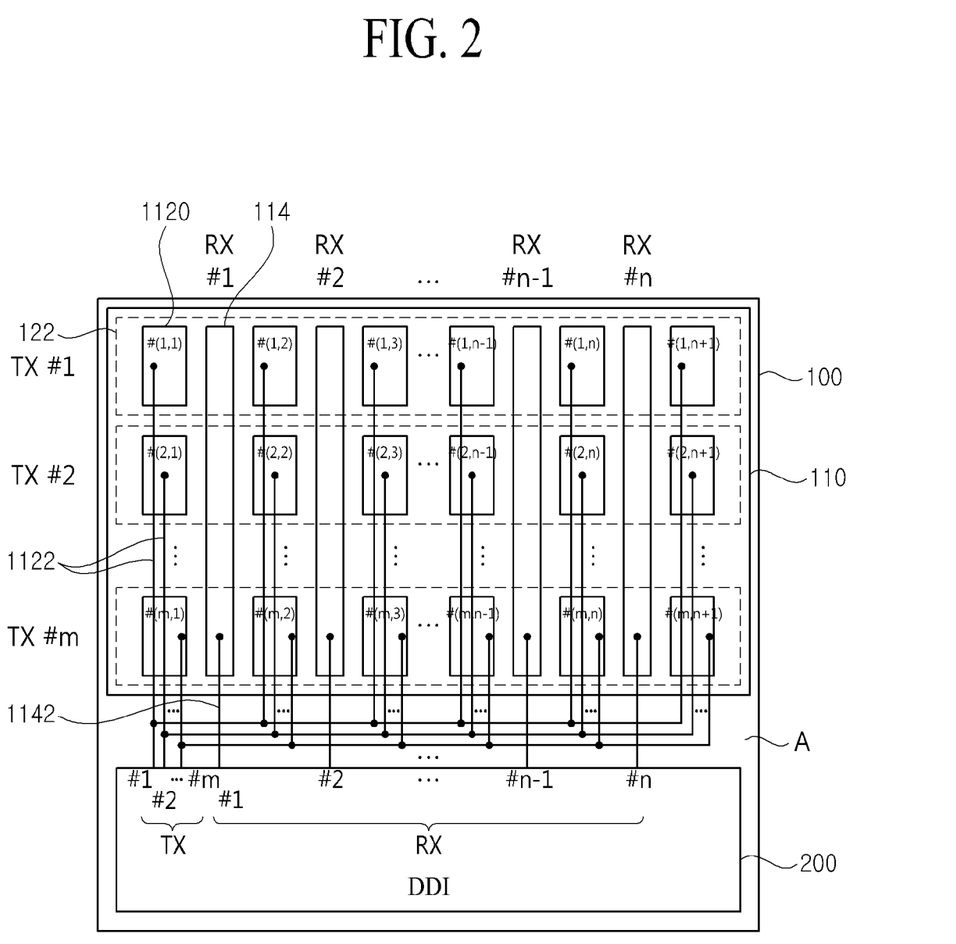
FIG. 2 is a diagram illustrating a detailed structure of a plurality of driving electrodes and a plurality of sensing electrodes illustrated in FIG. 1.

FIG. 1 is a diagram schematically illustrating a configuration of a display device with integrated touch screen according to embodiments of the present invention, and FIG. 2 is a diagram illustrating a detailed structure of a plurality of driving electrodes and a plurality of sensing electrodes illustrated in FIG. 1.

As illustrated in FIG. 1, the display device with integrated touch screen includes a panel 100, a display driver IC 200, and a touch IC 300.

The touch screen 110 is built in the panel 100, and the touch screen 110 includes a plurality of driving electrodes 112 and a plurality of sensing electrodes 114.

The respective driving electrodes 112 may be connected to the display driver IC 200 through a plurality of driving electrode lines 1122, and the respective sensing electrodes 114 may be connected to the display driver IC 200 through a plurality of sensing electrode lines 1142.

For example, when the display device with integrated touch screen is driven in a display driving mode, the driving electrodes 112 and the sensing electrodes 114 may perform the function of a common electrode. However, when the display device with integrated touch screen is driven in a touch driving mode, the driving electrodes 112 may perform the function of a touch driving electrode, and the sensing electrodes 114 may perform the function of a touch sensing electrode.

In other words, the driving electrodes and sensing electrodes of the display device with integrated touch screen according to embodiments of the present invention may act as common electrodes, and moreover may perform a function of a touch electrode as well as a function of a display electrode.

In an embodiment, the driving electrodes 112 may be formed parallelly in a width direction that is the direction of a gate line (not shown) in the panel 100. Each of the sensing electrodes 114 may be disposed between adjacent sub driving electrodes among a plurality of sub driving electrodes (not shown), and formed in parallel in a height direction that is the direction of a data line (not shown) in the panel 100.

For example, as illustrated in FIG. 2, the driving electrodes 112 may include first to mth driving electrodes TX#1 to TX#m, and each of the driving electrodes 112 may include n+1 number of sub driving electrodes 1120. Also, the sensing electrodes 114 may include first to nth sensing electrodes RX#1 to RX#n. In order to configure one driving electrode, the sub driving electrodes 1120 may be electrically connected to each other by a plurality of driving electrode lines 1122 in a non-display area A of the panel 100 which is formed outside the display driver IC 200, respectively. Alternatively, although not shown, the sub driving electrodes 1120 may be electrically connected to each other in the display driver IC 200, or may be electrically connected to each other through respective connection lines in a display area of the panel 100.

Each of the driving electrodes 112 may be formed as a plurality of block-form common electrodes that are formed to be overlapped with a plurality of unit pixel areas, and each of the sensing electrodes 114 may be formed as one block-form common electrode that is formed to be overlapped with the unit pixel areas.

The driving electrodes 112 and the sensing electrodes 114 need to act as a common electrode for driving liquid crystal, and thus may be formed of a transparent material such as indium tin oxide (ITO).

During a first period in which the panel 100 operates in the display driving mode, the display driver IC 200 generates a common voltage (Vcom), and applies the common voltage to the plurality of driving electrodes 112 and the plurality of sensing electrodes 114.

For example, when the panel 100 operates in the display driving mode, the plurality of driving electrodes 112 and the plurality of sensing electrodes 114 should perform a function of a display electrode, and thus, the display driver IC 200 may apply the common voltage to the plurality of driving electrodes 112 and the plurality of sensing electrodes 114.

Moreover, during a second period in which the panel 100 operates in a touch driving mode, the display driver IC 200 generates a pulse-modulated driving pulse according to a timing pulse an a pulse modulation control signal to apply the pulse-modulated driving pulse to the plurality of driving electrodes 112, and respectively receives sensing signals from the plurality of sensing electrodes 114 to transfer the sensing signals to the touch IC 300.

For example, the display driver IC 200 may generate the driving pulse by using the timing pulse generated by the touch IC 300, and apply the driving pulse to the plurality of driving electrodes. Here, the timing pulse includes only timing information of the driving pulse, and the display driver IC 200 may generate the pulse-modulated driving pulse by using the timing pulse, which includes the timing information of the driving pulse, and the pulse modulation control signal including pulse modulation time information.

The driving pulse may be divided into an up section voltage which is pulse-modulated based on an up pulse modulation voltage, a high level driving voltage, a down section voltage which is pulse-modulated based on a down pulse modulation voltage, and a low level driving voltage.

For example, the display driver IC 200 may generate the up section voltage which is pulse-modulated into a voltage lower than the up pulse modulation voltage, or generate the up section voltage which is pulse-modulated into a voltage higher than the up pulse modulation voltage. Also, the display driver IC 200 may generate the down section voltage which is pulse-modulated into a voltage higher than the down pulse modulation voltage, or generate the down section voltage which is pulse-modulated into a voltage lower than the down pulse modulation voltage.

The display driver IC 200 may generate the up section voltage by using the up pulse modulation voltage and the pulse modulation control signal, and generate the down section voltage by using the down pulse modulation voltage and the pulse modulation control signal.

In other words, the display driver IC 200 may generate a pulse-modulated up section voltage on the basis of the up pulse modulation voltage, and generate a pulse-modulated down section voltage on the basis of the down pulse modulation voltage, for a time corresponding to a pulse width of the pulse modulation control signal.

Therefore, the display device with integrated touch screen according to embodiments of the present invention applies the driving pulse, which is pulse-modulated based on the up pulse modulation voltage and the down pulse modulation voltage, to the driving electrodes, and thus prevents a waveform from being distorted by the driving pulse, thereby reducing a charging time deviation for each driving electrode.

Moreover, the display driver IC 200 generates a gate control signal and a data control signal with a timing signal transmitted from an external system, and realigns input video data signals so as to match the pixel structure of the panel 100, for outputting an image through the panel 100.

To this end, the display driver IC 200 may further include a gate driver that applies a scan signal to a gate line, a data driver that applies an image data signal to a data line, and a controller that controls the elements.

The touch IC 300 generates a timing pulse to apply the timing pulse to the display driver IC 200, and receives a sensing signal from the display driver IC 200 to determine whether there is a touch.

To this end, the touch IC 300 includes a driver 310 and a sensing unit 320. Here, the touch IC 300 may be connected to the display driver IC 200 through a flexible printed circuit board (FPCB) 201.

The driver 310 generates the timing pulse to apply the timing pulse to the display driver IC 200, and the sensing unit 320 receives a sensing signal from the display driver IC 200 to determine whether there is a touch. Also, a touch sensing reference voltage VRX_REF is applied to the sensing unit 320, and the touch sensing reference voltage VRX_REF is substantially applied to a sensing electrode by an operational amplifier included in the sensing unit 320.

Therefore, the touch IC 300 determines whether there is a touch, by using a shift of a voltage caused by a capacitance change between a driving electrode and a sensing electrode with respect to the touch sensing reference voltage VRX_REF.

Hereinafter, the display driver IC 200 and the touch IC 300 will be described in detail with reference to FIG. 3.

Figure 3:
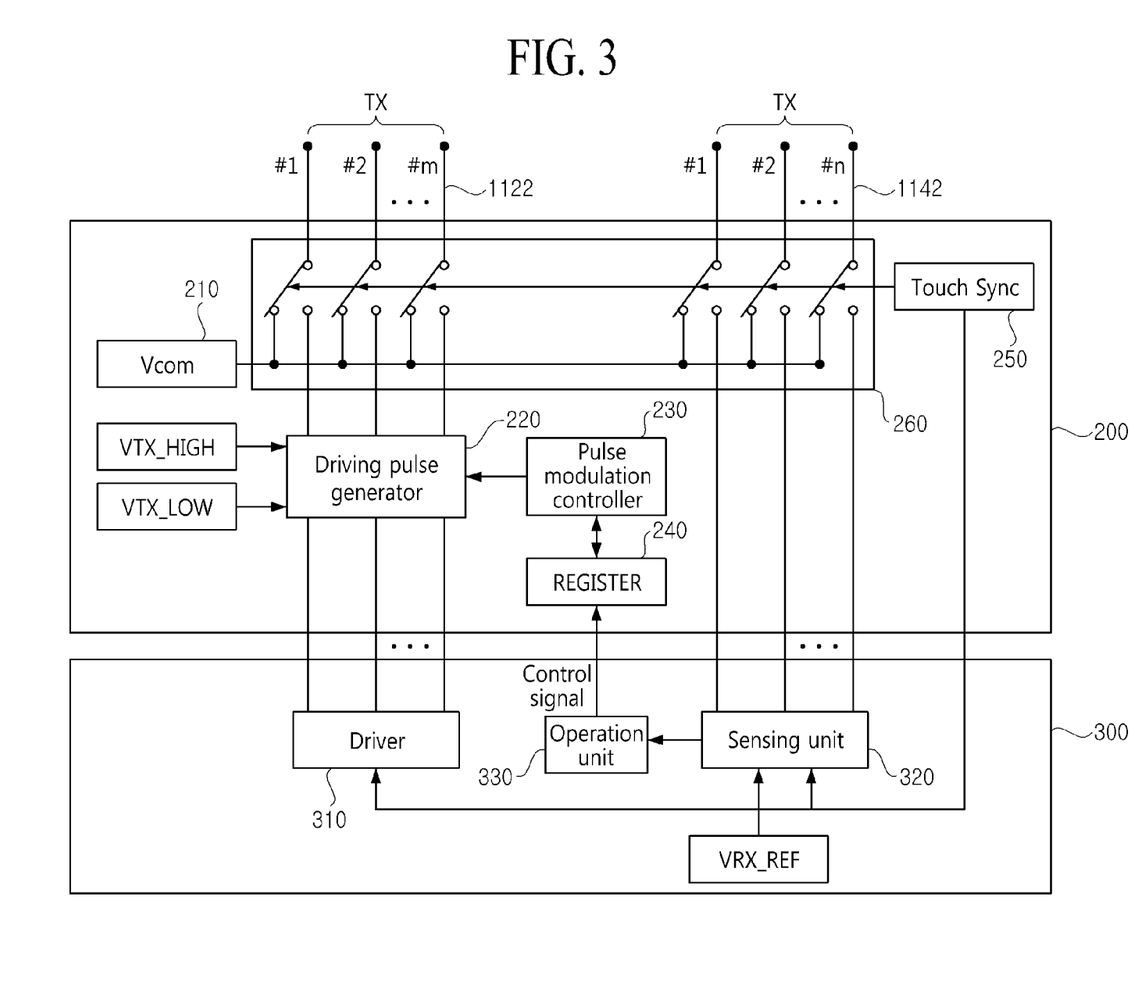
FIG. 3 is a diagram schematically illustrating configurations of a display driver integrated circuit (IC) and a touch IC according to embodiments of the present invention.

FIG. 3 is a diagram schematically illustrating configurations of the display driver IC and the touch IC according to embodiments of the present invention.

The display driver IC 200, as illustrated in FIG. 3, may include a common voltage generator 210, a driving pulse generator 220, a pulse modulation controller 230, a register 240, a sync signal generator 250, and a switching unit 260.

The common voltage generator 210 generates the common voltage Vcom for driving liquid crystal, and outputs the common voltage to the switching unit 250.

The driving pulse generator 220 generates the driving pulse by using the timing pulse, the up pulse modulation voltage, the down pulse modulation voltage, and the pulse modulation control signal which are generated by the driver 310 of the touch IC 300. Here, the driving pulse generator 220 may be a level shifter that shifts a voltage.

For example, the driving pulse generator 220 may generate the an up section voltage which is pulse-modulated based on the up pulse modulation voltage, the high level driving voltage VTX_HIGH, the down section voltage which is pulse-modulated based on the down pulse modulation voltage, and the low level driving voltage VTX_LOW.

In detail, the driving pulse generator 220 may generate the up section voltage which is pulse-modulated into a voltage higher or lower than the up pulse modulation voltage, and generate the down section voltage which is pulse-modulated into a voltage higher or lower than the down pulse modulation voltage.

For example, the driving pulse generator 220 may generate the driving pulse by using the timing information of the timing pulse generated by the touch IC 300.

In detail, when the timing pulse rises from a low voltage to a high voltage, the driving pulse generator 220 may generate and output the up section voltage, and generate and output the high level driving voltage VTX_HIGH. Also, when the timing pulse falls from the high voltage to the low voltage, the driving pulse generator 220 may generate and output the down section voltage, and generate and output the low level driving voltage VTX_LOW.

For example, the driving pulse generator 220 may generate the driving pulse by using the pulse modulation control signal.

In detail, when the timing pulse rises from the low voltage to the high voltage, the driving pulse generator 220 may generate and output the up section voltage for the time corresponding to the pulse width of the pulse modulation control signal. Also, when the timing pulse falls from the high voltage to the low voltage, the driving pulse generator 220 may generate and output the down section voltage for the time corresponding to the pulse width of the pulse modulation control signal.

Hereinafter, the driving pulse will be described in detail with reference to FIGS. 4 and 5.

Figure 4:
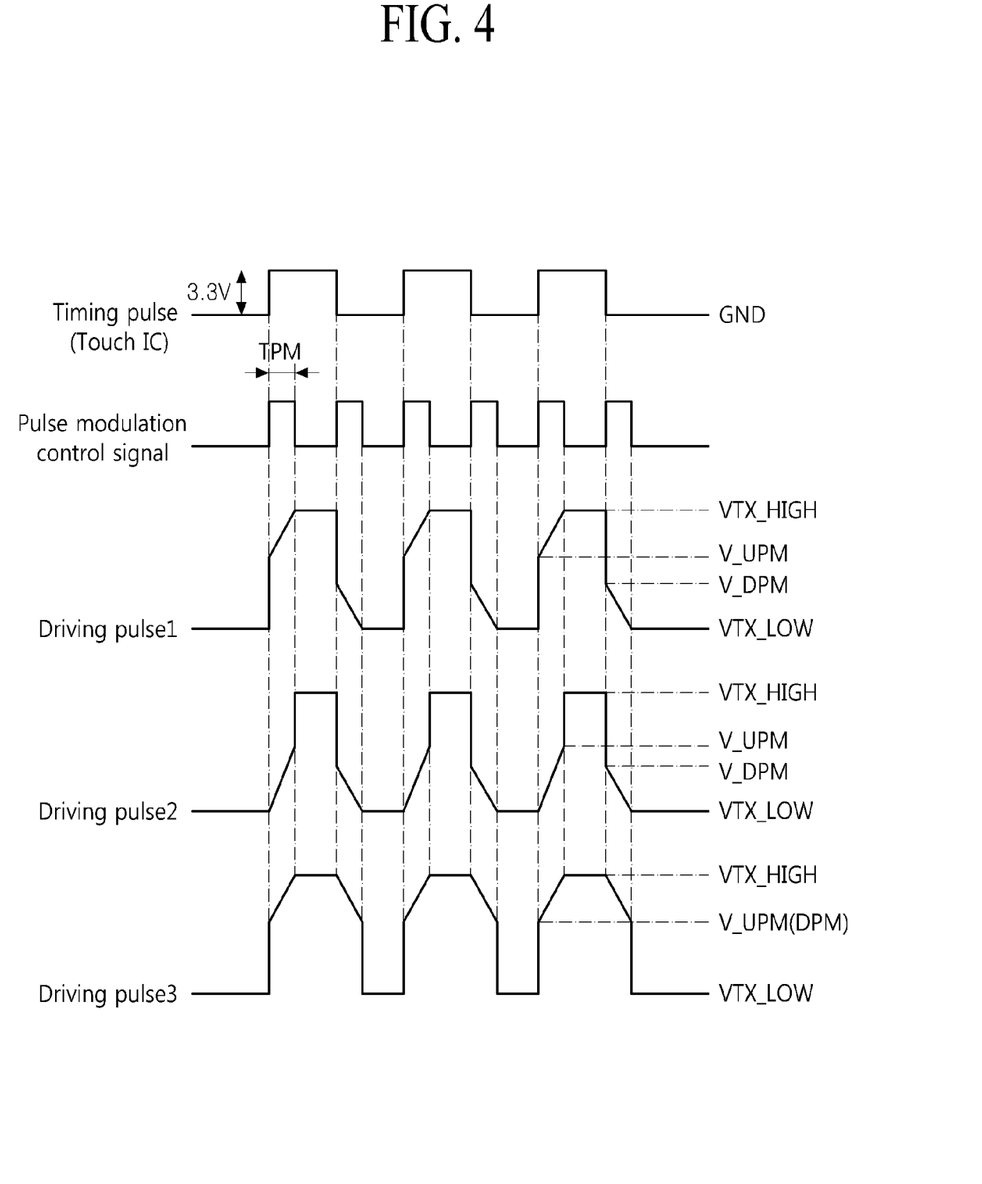
FIG. 4 is a diagram showing an example of each of a timing pulse and a driving pulse applied to the display device with integrated touch screen according to embodiments of the present invention.
Figure 5:
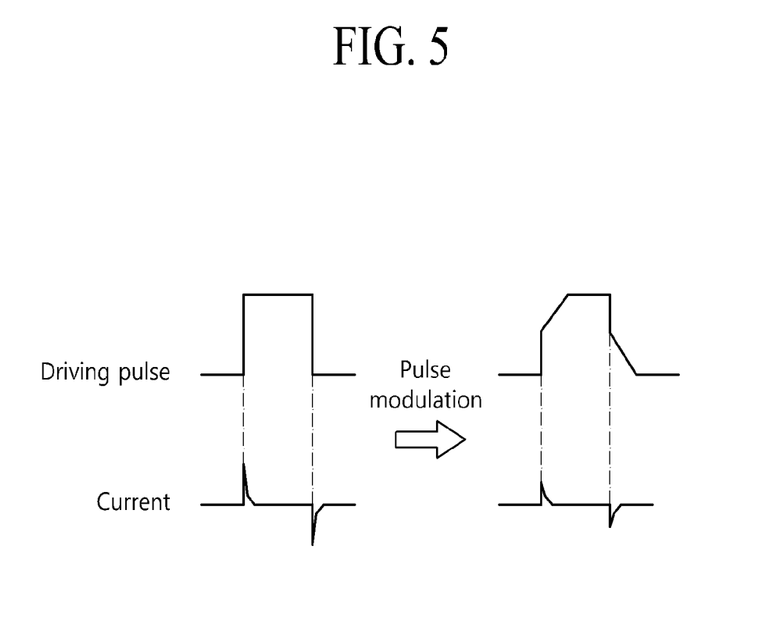
FIG. 5 is a diagram for describing an effect obtained by a pulse-modulated driving pulse applied to the display device with integrated touch screen according to embodiments of the present invention.

FIG. 4 is a diagram showing an example of each of a timing pulse and a driving pulse applied to the display device with integrated touch screen according to embodiments of the present invention, and FIG. 5 is a diagram for describing an effect obtained by a pulse-modulated driving pulse applied to the display device with integrated touch screen according to embodiments of the present invention.

As shown in FIG. 4, like a driving pulse 1, the driving pulse may be pulse-modulated into a voltage higher than the up pulse modulation voltage V_UPM, and pulse-modulated into a voltage lower than the down pulse modulation voltage V_DPM. Like a driving pulse 2, the driving pulse may be pulse-modulated into a voltage lower than the up pulse modulation voltage V_UPM, and pulse-modulated into a voltage lower than the down pulse modulation voltage V_DPM. Like a driving pulse 3, the driving pulse may be pulse-modulated into a voltage higher than the up pulse modulation voltage V_UPM, and pulse-modulated into a voltage higher than the down pulse modulation voltage V_DPM.

Here, in the driving pulses 1 and 2, a value of the up pulse modulation voltages V_UPM may differ from a value of the down pulse modulation voltage V_DPM. However, in the driving pulse 3, the value of the up pulse modulation voltages V_UPM may be the same as the value of the down pulse modulation voltage V_DPM. Alternatively, in the driving pulse 3, the value of the up pulse modulation voltages V_UPM may differ from the value of the down pulse modulation voltage V_DPM.

Moreover, as shown in FIG. 4, it can be seen that all the driving pulses 1 to 3 are generated according to the timing pulse generated by the touch IC 300, and are pulse-modulated for the time TPM corresponding to the pulse width of the pulse modulation control signal.

For example, the timing pulse is a voltage between a ground GND voltage and 3.3 V, and may include the timing information of the driving pulse. In the driving pulses 1 to 3, it can be seen that when the timing pulse rises from a low voltage (GND) to a high voltage (3.3 V), the up section voltage which is pulse-modulated based on the up pulse modulation voltage V_UPM is generated for the time TPM corresponding to the pulse width of the pulse modulation control signal, and when the timing pulse falls from the high voltage (3.3 V) to the low voltage (GND), the down section voltage which is pulse-modulated based on the down pulse modulation voltage V_DPM is generated for the time TPM corresponding to the pulse width of the pulse modulation control signal.

Therefore, by using the driving pulse which is pulse-modulated based on the up pulse modulation voltage and the down pulse modulation voltage, the display device with integrated touch screen according to embodiments of the present invention can prevent a waveform from being distorted by the driving pulse. Also, a high-frequency component of the driving pulse is reduced by using the pulse-modulated driving pulse, and thus, a peak current decreases, thereby effectively reducing power consumption.

For example, it can be seen that in a left driving pulse of FIG. 5 which is not pulse-modulated, the peak current is higher, but in a right pulse-modulated driving pulse of FIG. 5, the high-frequency component of the driving pulse is reduced by the pulse modulation, and thus, the peak current decreases.

With further reference to FIG. 3, the pulse modulation controller 230 adjusts the up pulse modulation voltage and the down pulse modulation voltage, adjusts the pulse width of the pulse modulation control signal, and controls the driving pulse generator 220 so as to generate the driving pulse according to the adjusted up pulse modulation voltage, down pulse modulation voltage, and pulse modulation control signal.

The register 240 may store the value of the up pulse modulation voltage, the value of the down pulse modulation voltage, and the time corresponding to the pulse width of the pulse modulation control signal for each of the plurality of driving electrodes.

For example, the value of the up pulse modulation voltage, the value of the down pulse modulation voltage, and the time corresponding to the pulse width of the pulse modulation control signal for each driving electrode may be previously set and stored in the register 240, or may be changed according to a control signal of an operation unit 330 of the touch IC 300 to be described below.

Therefore, the display device with integrated touch screen according to embodiments of the present invention applies a pulse-modulated driving pulse to each driving electrode, and thus, a charging time deviation caused by that a driving electrode becomes farther away from the display driver IC 200 can be reduced. Accordingly, a touch sensitivity increases for each driving electrode, and thus, a touch performance deviation is improved, thereby enhancing touch performance. Also, the peak current decreases, and thus, power consumption can be effectively reduced.

The sync signal generator 250 generates a sync signal (Touch Sync) that indicates a driving mode of the panel 100. Here, the sync signal may include a first sync signal, which indicates the display driving mode, and a second sync signal which indicates the touch driving mode.

For example, in an image output section where the panel 100 operates in the display driving mode, the sync signal generator 250 generates the first sync signal which indicates the display driving mode, and outputs the first sync signal to the switching unit 260 and the touch IC 300. In a touch sensing section where the panel 100 operates in the touch driving mode, the sync signal generator 250 generates the second sync signal which indicates the touch driving mode, and outputs the second sync signal to the switching unit 260 and the touch IC 300.

When the first sync signal is input, the switching unit 260 connects the common voltage generator 210 to the plurality of driving electrodes and the plurality of sensing electrodes, and thus, the common voltage Vcom is applied to the plurality of driving electrodes and the plurality of sensing electrodes. Also, when the second sync signal is input, the switching unit 260 connects the driving pulse generator 220 to the plurality of driving electrodes and connects the sensing unit 320 of the touch IC 300 to the plurality of sensing electrodes, and thus, the driving pulse is applied to the plurality of driving electrodes, and a plurality of sensing signals are respectively received from the plurality of sensing electrodes.

In the touch IC 300, as illustrated in FIG. 3, the driver 310 generates the timing pulse to output the timing pulse to the driving pulse generator 220, the touch sensing reference voltage VRX_REF is applied to the sensing unit 320, and the operation unit 330 performs an arithmetic operation on the value of the up pulse modulation voltage, the value of the down pulse modulation voltage, and the time corresponding to the pulse width of the pulse modulation control signal for each driving electrode according to the sensing signal to output a corresponding control signal to the register 240.

The sync signal, generated by the synch signal generator 250 of the display driver IC 200, is applied to the driver 310 and the sensing unit 320. The driver 310 and the sensing unit 320 operate according to the sync signal generated by the synch signal generator 250 of the display driver IC 200.

For example, when the second synch signal indicating the touch driving mode is input, the driver 310 may generate a first driving pulse to output the first driving pulse to the driving pulse generator 220 of the display driver IC 200, and the sensing unit 320 may receive a sensing signal from the display driver IC 200 to determine whether there is a touch.

The sensing unit 320 may include an operational amplifier (not shown) and an analog-to-digital converter (ADC, not shown), which correspond to each of the plurality of sensing electrodes 114.

For example, the operational amplifier (not shown) may include a non-inverting input terminal receiving the touch sensing reference voltage VRX_REF, an inverting input terminal connected to one of the plurality of sensing electrodes 114, and an output terminal connected to the ADC (not shown).

In detail, when the touch sensing reference voltage VRX_REF is applied to the non-inverting input terminal of the operational amplifier (not shown), the inverting input terminal and the non-inverting input terminal need to form a virtual ground in operating characteristic of the operational amplifier, and thus, the touch sensing reference voltage VRX_REF is substantially applied to the sensing electrodes 114.

Furthermore, although the driving electrode 112 is not electrically connected to the sensing electrode 114, a mutual capacitance ($C_M$) between the driving electrode 112 and the sensing electrode 114 is changed by the driving pulse applied to the driving electrode 112. The operational amplifier (not shown) may integrate the mutual capacitance change to output the integrated result as a voltage to the ADC (not shown), or transfer the mutual capacitance change as a voltage to the ADC (not shown).

The ADC (not shown) converts a voltage, output from the operational amplifier, into a digital code. Also, the sensing unit 320 may include a touch analyzer (not shown) that analyzes the mutual capacitance change output from the ADC (not shown) to determine whether there is a touch.

Hereinafter, a method of driving the display device with integrated touch screen according to embodiments of the present invention will be described with reference to FIG. 6.

Figure 6:
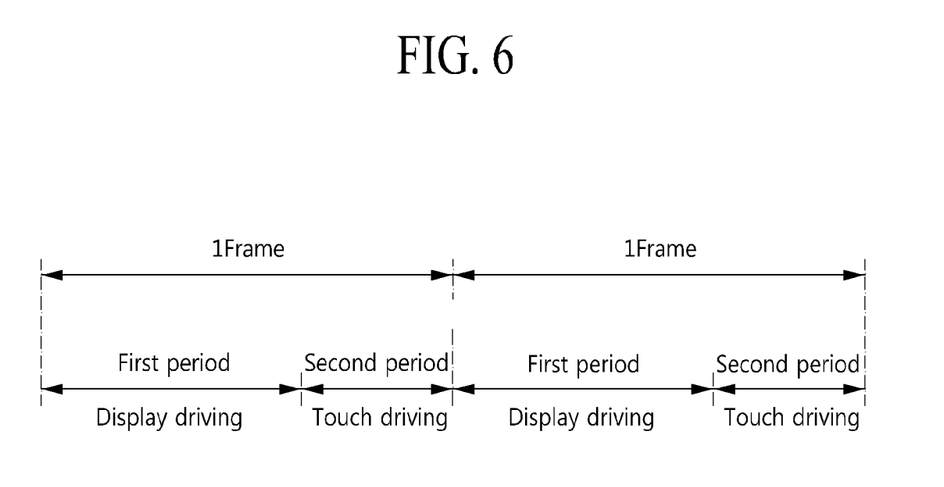
FIG. 6 is a schematic timing chart for describing a method of driving the display device with integrated touch screen according to embodiments of the present invention.

FIG. 6 is a schematic timing chart for describing a method of driving the display device with integrated touch screen according to embodiments of the present invention.

In the timing chart of FIG. 6, it is illustrated that each frame includes first and second periods, but the present embodiment is not limited thereto. According to another embodiment, the first and second periods may be alternatively included in each frame. In this case, also, a display driving frequency may be adjusted to 60 Hz, 120 Hz, 250 Hz, or more depending on the number and time of the first period that is the display driving mode, and a touch report rate may be adjusted to 60 Hz, 100 Hz, or more depending on the number and time of the second period that is the touch driving mode.

As illustrated in FIG. 6, the display driver IC 200 applies the common voltage to a plurality of electrodes during the first period.

For example, when the panel 100 is a mutual capacitance type during the first period in which the panel 100 operates in the display driving mode, the display driver IC 200 may apply the common voltage to the plurality of driving electrodes and the plurality of sensing electrodes.

Subsequently, during the second period, the display driver IC 200 generates a pulse-modulated driving pulse according to the timing pulse and the pulse modulation control signal to apply the pulse-modulated driving pulse to the plurality of driving electrodes, and the touch IC 300 determines whether there is a touch, by using the sensing signals respectively generated from the plurality of sensing electrodes.

For example, during the second period in which the panel 100 operates in the touch driving mode, the display driver IC 200 may apply the pulse-modulated driving pulse to the plurality of diving electrodes, and may respectively receive the sensing signals from the plurality of sensing electrodes to transfer the sensing signals to the touch IC 300. The touch IC 300 may determine whether there is a touch, by using the sensing signals.

Therefore, the method of driving the display device with integrated touch screen according to embodiments of the present invention applies the pulse-modulated driving pulse to each driving electrode, and thus increases a touch sensitivity, thereby enhancing touch performance.

According to the embodiments of the present invention, a charging time deviation for each driving electrode receiving the driving pulse is reduced by applying a pulse-modulated driving pulse to the driving electrodes, thereby improving touch performance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with integrated touch screen, the display device comprising:
    a panel configured to include a plurality of driving electrodes and a plurality of sensing electrodes; and
    a display driver IC configured to apply a common voltage to the plurality of driving electrodes and the plurality of sensing electrodes when the panel operates in a display driving mode, and
    when the panel operates in a touch driving mode, generate a pulse-modulated driving pulse according to a timing pulse and a pulse modulation control signal to apply the pulse-modulated driving pulse to the plurality of driving electrodes, and respectively receive a plurality of sensing signals from the plurality of sensing electrodes,
    wherein the driving pulse comprises an up section voltage which is pulse-modulated based on an up pulse modulation voltage, a high level driving voltage, a down section voltage which is pulse-modulated based on a down pulse modulation voltage, and a low level driving voltage.

2. The display device of claim 1, wherein the display driver IC generates the up section voltage by using the up pulse modulation voltage and the pulse modulation control signal, and generates the down section voltage by using the down pulse modulation voltage and the pulse modulation control signal.

3. The display device of claim 1, wherein the display driver IC comprises a pulse width controller configured to adjust the up pulse modulation voltage, the down pulse modulation voltage, and a pulse width of the pulse modulation control signal.

4. The display device of claim 3, wherein the display driver IC comprises a register configured to store a value of the up pulse modulation voltage, a value of the down pulse modulation voltage, and a time corresponding to the pulse width of the pulse modulation control signal for each of the plurality of driving electrodes.

5. The display device of claim 1, wherein the display driver IC comprises:
    a common voltage generator configured to generate the common voltage; and
    a driving pulse generator configured to generate the driving pulse by using the timing pulse, the up pulse modulation voltage, the down pulse modulation voltage, and the pulse modulation control signal.

6. The display device of claim 5, wherein the display driver IC comprises a switching unit configured to connect the common voltage generator to the plurality of driving electrodes and the plurality of sensing electrodes according to a first sync signal which indicates the display driving mode, and connect the driving pulse generator to the plurality of driving electrodes according to a second sync signal which indicates the touch driving mode.

7. The display device of claim 5, wherein,
    when the timing pulse rises from a low voltage to a high voltage, the driving pulse generator outputs the up section voltage for a time corresponding to a pulse width of the pulse modulation control signal, and
    when the timing pulse falls from the high voltage to the low voltage, the driving pulse generator outputs the down section voltage for the time corresponding to the pulse width of the pulse modulation control signal.

8. The display device of claim 7, wherein the driving pulse generator outputs the up section voltage and then outputs the high level driving voltage, and outputs the down section voltage and then outputs the low level driving voltage.

9. The display device of claim 1, further comprising a touch IC configured to generate the timing pulse to output the timing pulse to the display driver IC, and determine whether there is a touch, by using the plurality of sensing signals transferred from the display driver IC.

10. The display device of claim 9, wherein,
    the touch IC comprises an operation unit configured to perform an arithmetic operation on a value of the up pulse modulation voltage, a value of the down pulse modulation voltage, and a time corresponding to a pulse width of the pulse modulation control signal according to each of the plurality of sensing signals to output a corresponding control signal, and the display driver IC generates the driving pulse by using the value of the up pulse modulation voltage, the value of the down pulse modulation voltage, and the time corresponding to the pulse width of the pulse modulation control signal which are based on the corresponding control signal.

11. The display device of claim 1, wherein:

the up pulse modulation voltage has a value between the value of the high level driving voltage and the value of the low level driving voltage;

the down pulse modulation voltage has a value between the value of the high level driving voltage and the value of the low level driving voltage; and the driving pulse includes a change in slope at the up pulse modulation voltage and the down pulse modulation voltage.

12. A method of driving a display device with integrated touch screen, which includes a panel including a plurality of driving electrodes and a plurality of sensing electrodes, a display driver IC, and a touch IC, the method comprising:

applying, by the display driver IC, a common voltage to the plurality of driving electrodes and the plurality of sensing electrodes when the panel is operating in a display driving mode;

generating, by the touch IC, a timing pulse to output the timing pulse to the display driver IC when the panel is operating in a touch driving mode; and generating, by the display driver IC, a pulse-modulated driving pulse according to a timing pulse and a pulse modulation control signal to apply the pulse-modulated driving pulse to the plurality of driving electrodes, and respectively receiving a plurality of sensing signals from the plurality of sensing electrodes, wherein the driving pulse comprises an up section voltage which is pulse-modulated based on an up pulse modulation voltage, a high level driving voltage, a down section voltage which is pulse-modulated based on a down pulse modulation voltage, and a low level driving voltage.

13. The method of claim 12, wherein:

the up pulse modulation voltage has a value between the value of the high level driving voltage and the value of the low level driving voltage;

the down pulse modulation voltage has a value between the value of the high level driving voltage and the value of the low level driving voltage; and the driving pulse includes a change in slope at the up pulse modulation voltage and the down pulse modulation voltage.

* * * * *